United States Patent
Greenstreet

(10) Patent No.: US 7,076,680 B1
(45) Date of Patent: Jul. 11, 2006

(54) METHOD AND APPARATUS FOR PROVIDING SKEW COMPENSATION USING A SELF-TIMED SOURCE-SYNCHRONOUS NETWORK

(75) Inventor: Mark R. Greenstreet, Vancouver (CA)

(73) Assignee: Sun Microsystems, Inc., Santa Clara, CA (US)

( * ) Notice: Subject to any disclaimer, the term of this patent is extended or adjusted under 35 U.S.C. 154(b) by 423 days.

(21) Appl. No.: 10/459,196

(22) Filed: Jun. 10, 2003

Related U.S. Application Data

(60) Provisional application No. 60/455,213, filed on Mar. 14, 2003.

(51) Int. Cl.
   *G06F 12/00* (2006.01)
(52) U.S. Cl. .............. 713/503; 713/400; 713/401; 713/500; 713/501; 713/600; 713/601
(58) Field of Classification Search ........... 713/400, 713/401, 500–503, 600, 601
   See application file for complete search history.

(56) References Cited

U.S. PATENT DOCUMENTS

| | | | |
|---|---|---|---|
| 6,377,582 B1 * | 4/2002 | Neiger | 370/406 |
| 6,430,639 B1 * | 8/2002 | Meyer et al. | 710/200 |
| 6,505,149 B1 * | 1/2003 | Griswold et al. | 703/14 |
| 6,636,518 B1 * | 10/2003 | Liencres | 370/395.7 |
| 6,636,955 B1 * | 10/2003 | Kessler et al. | 711/167 |
| 6,748,513 B1 * | 6/2004 | Rajappa et al. | 711/211 |
| 6,889,334 B1 * | 5/2005 | Magro et al. | 713/500 |
| 6,898,682 B1 * | 5/2005 | Welker et al. | 711/163 |
| 6,915,407 B1 * | 7/2005 | Rajappa et al. | 711/211 |
| 2003/0204697 A1 * | 10/2003 | Kessler et al. | 711/167 |
| 2004/0008203 A1 * | 1/2004 | Rodrigues et al. | 345/535 |
| 2004/0013127 A1 * | 1/2004 | Shvodian | 370/442 |
| 2005/0021832 A1 * | 1/2005 | Bennett et al. | 709/235 |

* cited by examiner

*Primary Examiner*—A. Elamin
(74) *Attorney, Agent, or Firm*—Park, Vaughan & Fleming LLP

(57) ABSTRACT

One embodiment of the present invention provides a system that provides skew compensation for communications across a source-synchronous self-timed network. During each clock period, the system allows multiple synchronous transmitters to each transmit one data element and to assert one acknowledgement on a transmit clock line into the self-timed network. In doing so, the multiple synchronous transmitters do not wait for requests from the self-timed network before transmitting a subsequent data element. Similarly, during each clock period, the system allows multiple synchronous receivers to accept one data element from and to assert one request on a receive clock line coupled into the self-timed network. In doing so, the multiple synchronous receivers do not wait for acknowledgments from the self-timed network before receiving a subsequent data element. The self-timed network is configured to tolerate bounded skew between the multiple synchronous transmitters and multiple synchronous receivers.

25 Claims, 6 Drawing Sheets

METHOD AND APPARATUS FOR PROVIDING SKEW COMPENSATION USING A SELF-TIMED SOURCE-SYNCHRONOUS NETWORK

RELATED APPLICATION

This application hereby claims priority under 35 U.S.C. §119 to U.S. Provisional Patent Application No. 60/455,213, filed on 14 Mar. 2003, entitled "Method and Apparatus for Providing Skew Compensation Using a Self-Timed Source-Synchronous Network," by inventor Mark R. Greenstreet.

BACKGROUND

1. Field of the Invention

The present invention relates to techniques for transmitting data through electrical signals. More specifically, the present invention relates to a method and an apparatus for providing skew compensation through a self-timed source-synchronous network.

2. Related Art

As computer system clock speeds continue to increase at an exponential rate, it is becoming increasingly harder to synchronize communications between computer system components with reference to a centralized system clock. To deal with this problem, computer system designers are increasingly using source-synchronous techniques to communicate between computer system components.

Source-synchronous communication allows synchronous design to be used for interfaces with large uncertainties in the relative clock phase between the sender and receiver. Referring to FIG. 1A, existing designs are typically composed of a sender 102 and a receiver 104 that are coupled to a common frequency 106 reference to guarantee that they operate at exactly the same frequency. Sender 102 forwards its clock 108 along with data 110 that it is sending to receiver 104. Receiver 104 uses the forwarded clock 108 to load data from the transmitter into a first-in-first-out (FIFO) buffer 112. Receiver 104 subsequently uses its own version of the clock 114 to remove the data from the FIFO 112. Because the two clocks operate at the same frequency, FIFO 112 can be guaranteed to never overflow nor underflow. Note that these existing source-synchronous designs (such as the design illustrated in FIG. 1A) provide point-to-point communication.

However, in many applications, such as multiprocessors, graphics engines, and network interfaces, the communication structure is many-to-many. To implement this with traditional source-synchronous techniques, a synchronous switch fabric 120 can be used to couple the various system components together as is illustrated in FIG. 1B. This synchronous switch fabric 120 operates with reference to a system clock signal 122. Furthermore, a FIFO is included at each input of the switch fabric to align incoming data from each sender to the clock of the switch fabric. Additionally, a FIFO is added to each receiver of data to align data from the switch fabric to the receiver's clock. Note that each FIFO along a transmission path increases the latency through the interface.

Hence, what is needed is a method and an apparatus for providing many-to-many communication while minimizing the additional latency arising from additional FIFOs along the transmission path.

SUMMARY

One embodiment of the present invention provides a system that provides skew compensation for communications across a source-synchronous self-timed network. During each clock period, the system allows multiple synchronous transmitters to each transmit one data element and to assert one acknowledgement on a transmit clock line into the self-timed network. In doing so, the multiple synchronous transmitters do not wait for requests from the self-timed network before transmitting a subsequent data element. Similarly, during each clock period, the system allows multiple synchronous receivers to accept one data element from and to assert one request on a receive clock line coupled into the self-timed network. In doing so, the multiple synchronous receivers do not wait for acknowledgments from the self-timed network before receiving a subsequent data element. The self-timed network is configured to tolerate bounded skew between the multiple synchronous transmitters and multiple synchronous receivers.

In a variation on this embodiment, the system additionally routes data elements across the self-timed network between the multiple synchronous transmitters and the multiple synchronous receivers.

In a further variation, the routing of data elements across the self-timed network is regulated using Muller C-elements.

In a further variation, routing the data elements across the self-timed network involves using a two-dimensional mesh to route the data elements.

In a further variation, routing the data elements across the self-timed network involves using intermediate routing nodes that generate a response before a subsequent input arrives, whereby data elements in-flight across the self-timed network do not stack up at the intermediate routing nodes.

In a variation on this embodiment, the system provides queuing for data between the self-timed network and the multiple synchronous receivers using first-in-first-out (FIFO) buffers.

Figure 1A:
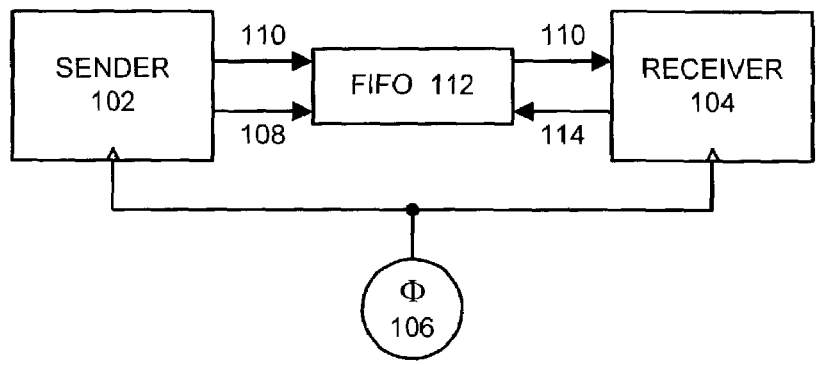
FIG. 1A illustrates a point-to-point source-synchronous communication system that uses a FIFO.
Figure 1B:
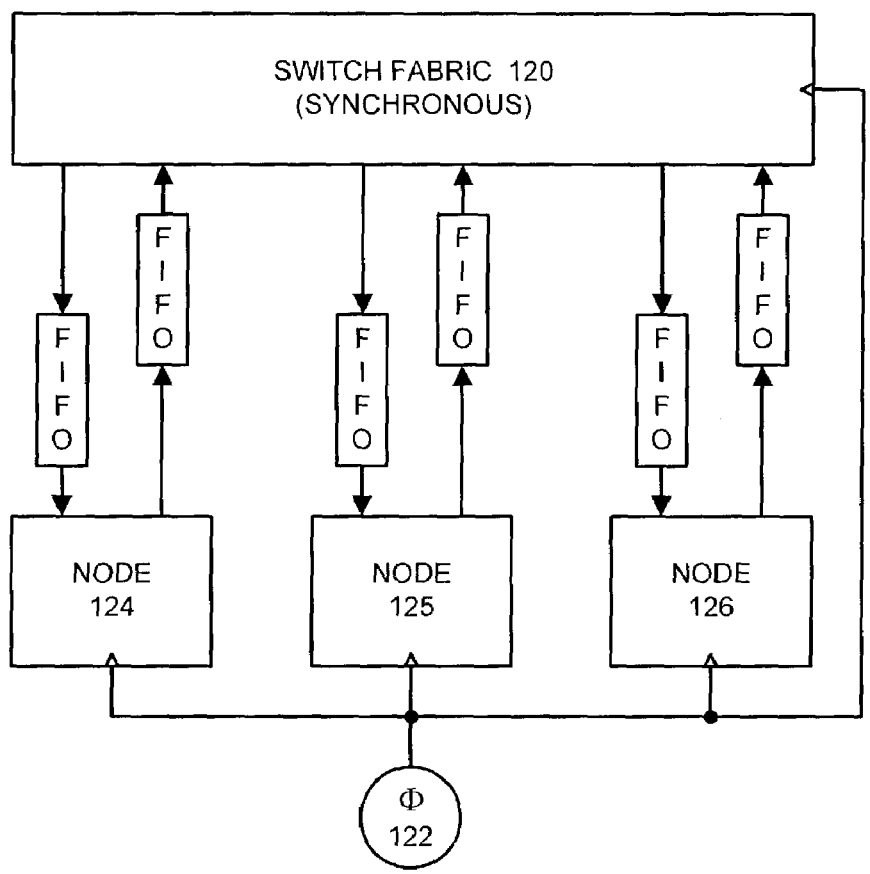
FIG. 1B illustrates a many-to-many source-synchronous communication system that makes use of a synchronous communication network.

Table 1 illustrates timing parameters for the interface illustrated in FIG. 1.

Figure 5:
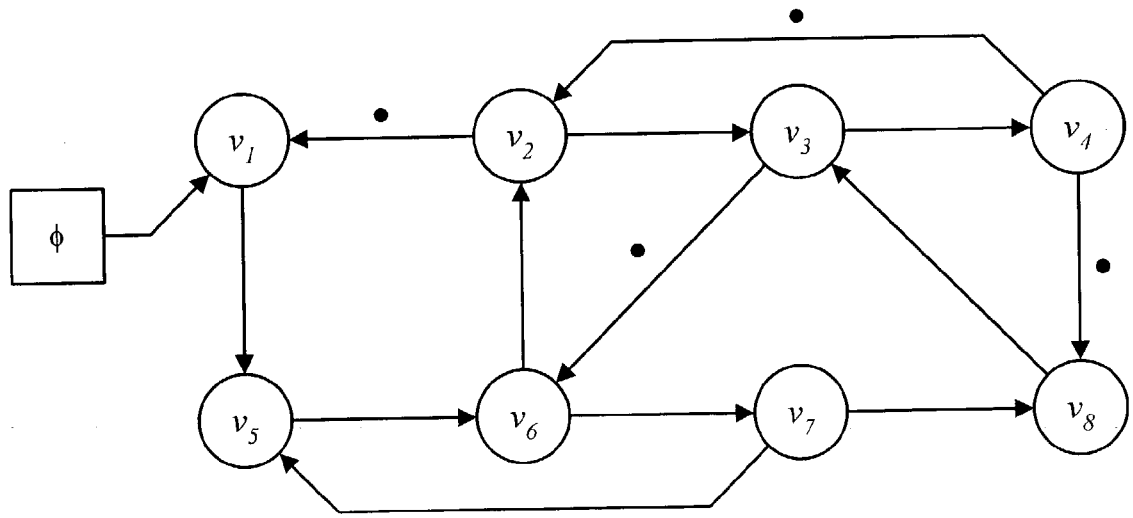
FIG. 5 illustrates a marked graph for a polyphase clock buffer in accordance with an embodiment of the present invention.

Table 2 illustrates firing times for elements in the polyphase block buffer illustrated in FIG. 5.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Clock Skew

We start by defining clock skew. In synchronous design, latches controlled by clocks store data values. As a simple example, a latch can have a data input, a data output, and one or more clock inputs. The clock signals are periodic. This period can be divided into "phases." The latch guarantees that if the data input has some stable value during some particular phase (or phases) of the clock period, then the data output will have that value during some other phase (or phases) of the clock period. In particular, the output retains the its value after the input is allowed to change again. This property allows a latch to be used for data storage.

The phase or phases of the clock period during which the input must be stable to guarantee correct operation define the "critical window" for the latch. If the latch's input changes during the critical window, then its output cannot be guaranteed to behave in a way that has a consistent discrete explanation. Such "synchronization failures" can lead to system failures.

Figure 1C:
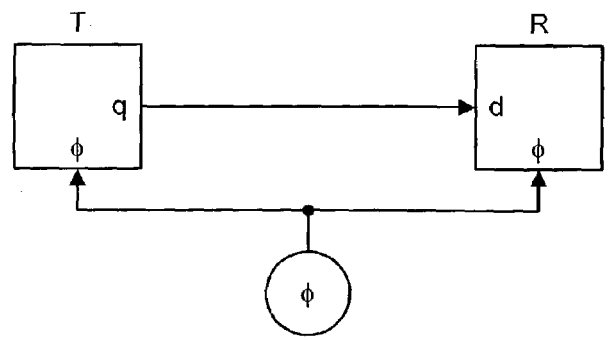
FIG. 1C illustrates point-to-point synchronous communication without a FIFO.

FIG. 1C shows a simple model of synchronous communication. A global clock generator, $\Phi$, produces a clock signal which is sent to the transmitter, T, and the receiver, R. Proper operation requires that the data input of the receiver, R.d, is stable during the critical window as defined by the clock signal at the receiver, $R.\Phi$.

Each component and wire introduces delays. Let $\delta_{\Phi \to T.\Phi}$ denote the delay from the clock generator to the clock input of the transmitter. Let $\delta_{T.\Phi \to T.q}$ denote the delay from the clock input to the data output of the transmitter. Let $\delta_{T.q \to R.d}$ denote the delay from the data output of the transmitter to the data input of the receiver. Let $\delta_{\Phi \to R.\Phi}$ denote the delay from the clock generator to the clock input of the receiver. At the receiver, data arrives $\delta_{R.\Phi \to R.d}$ time units after the clock signal, where, $$\delta_{R.\Phi \to R.d} = \delta_{\Phi \to T.\Phi} + \delta_{T.\Phi \to T.q} + \delta_{T.q \to R.d} - \delta_{\Phi \to R.\Phi}$$

In engineering practice, the term "clock skew" has been used to refer to many timing quantities in a synchronous interface. Some engineers refer to the time difference in the arrival of the clock signal at two communicating components as the skew; this quantity is $\delta_{\Phi \to T.\Phi} - \delta_{\Phi \to R.\Phi}$. However, both clock and data delays must be considered to ensure reliable communication. To give precise definitions of skew, each quantity from the above equation can be divided into three components: a "design" component, a "static" component, and a "dynamic" component. In particular, let:

$$\delta_{\Phi \to T.\Phi} = \delta_{\Phi \to T.\Phi}^{design} + \delta_{\Phi \to T.\Phi}^{static} + \delta_{\Phi \to T.\Phi}^{dynamic}$$

where $\delta_{\Phi \to T.\Phi}$ is the total delay from the clock generator to the transmitter;

$$\delta_{\Phi \to T.\Phi}^{design}$$

is the portion of this delay that is the same for all instances of the design;

$$\delta_{\Phi \to T.\Phi}^{static}$$

is the portion of this delay that is the same throughout the operation of a single instance of the design; and $$\delta_{\Phi \to T.\Phi}^{dynamic}$$

is the portion that can be different for different operations of the same instance of the design. The delays $$\delta_{T.\Phi \to T.q}^{design}, \delta_{T.\Phi \to T.q}^{static}, \delta_{T.\Phi \to T.q}^{dynamic}, \delta_{T.q \to R.d}^{design}, \delta_{T.q \to R.d}^{static}, \delta_{T.q \to R.d}^{dynamic},$$

$$\delta_{\Phi \to R.\Phi}^{design}, \delta_{\Phi \to R.\Phi}^{static}, \delta_{\Phi \to R.\Phi}^{dynamic}, \delta_{R.d \to R.\Phi}^{design}, \delta_{R.d \to R.\Phi}^{static}, \text{ and } \delta_{R.d \to R.\Phi}^{dynamic},$$

are defined similarly.

Table 1 gives values for the various timing parameters for an implementation of the interface shown in FIG. 1C. For example, $\delta_{\Phi \to T.\Phi}$ is the delay from the clock generator to the transmitter, where $$\delta_{\Phi \to T.\Phi} = \delta_{\Phi \to T.\Phi}^{design} + \delta_{\Phi \to T.\Phi}^{static} + \delta_{\Phi \to T.\Phi}^{dynamic} \in [1.15 \text{ ns}, 1.65 \text{ ns}].$$

This delay has three components. The design component, $$\delta_{\Phi \to T.\Phi}^{design} = 1.4 \text{ ns}$$

is the part of the delay that can be determined from the design (e.g., from electrical properties of the wires connecting the clock generator to the transmitter). The static component, $$\delta_{\Phi \to T.\Phi}^{static} \in \pm 0.2 \text{ ns}$$

is the part that is fixed for any particular instance of the design, but may have different values for different instances. For example, one module may be fabricated on a ceramic substrate that has a slightly lower dielectric constant than the nominal value, and for this instance $$\delta_{\Phi \to T \cdot \Phi}^{static} = -0.1 \ ns.$$

For this instance, $\delta_{\Phi \to T \cdot \Phi} \in [1.25 \ ns, 1.35 \ ns]$. Another module may be fabricated on a substrate with a larger dielectric constant yielding $$\delta_{\Phi \to T \cdot \Phi}^{static} = 0.15 \ ns.$$

For this second instance, $\delta_{\Phi \to T \cdot \Phi} \in [1.5 \ ns, 1.6 \ ns]$. The dynamic component, $$\delta_{\Phi \to T \cdot \Phi}^{dynamic} \pm 0.05 \ ns$$

represents the variations in the delay that can occur while the module is operating, for example due to fluctuations in temperature, power-supply voltage, etc. Different techniques can be applied to address each component of the delay. The present invention addresses all three components.

TABLE 1

| | design | static | dynamic |
|---|---|---|---|
| $\Phi \to T \cdot \Phi$ | $\delta_{\Phi \to T \cdot \Phi}^{design} = 1.4$ ns | $\delta_{\Phi \to T \cdot \Phi}^{static} \in \pm 0.2$ ns | $\delta_{\Phi \to T \cdot \Phi}^{dynamic} \in \pm 0.05$ ns |
| $T \cdot \Phi \to T \cdot q$ | $\delta_{T \cdot \Phi \to T \cdot q}^{design} = 0.6$ ns | $\delta_{T \cdot \Phi \to T \cdot q}^{static} \in \pm 0.1$ ns | $\delta_{T \cdot \Phi \to T \cdot q}^{dynamic} \in \pm 0.20$ ns |
| $T \cdot q \to R \cdot d$ | $\delta_{T \cdot q \to R \cdot d}^{design} = 0.8$ ns | $\delta_{T \cdot q \to R \cdot d}^{static} \in \pm 0.1$ ns | $\delta_{T \cdot q \to R \cdot d}^{dynamic} \in \pm 0.10$ ns |
| $\Phi \to R \cdot \Phi$ | $\delta_{\Phi \to R \cdot \Phi}^{design} = 1.1$ ns | $\delta_{\Phi \to R \cdot \Phi}^{static} \in \pm 0.1$ ns | $\delta_{\Phi \to R \cdot \Phi}^{dynamic} \in \pm 0.05$ ns |
| skew | $\delta_{R \cdot \Phi \to R \cdot d}^{design} = 1.7$ ns | $\delta_{R \cdot \Phi \to R \cdot d}^{statics} \in \pm 0.5$ ns | $\delta_{R \cdot \Phi \to R \cdot d}^{dynamic} \in \pm 0.40$ ns |

The engineering literature considers several measurements of skew that can be defined in terms of the three components of delays as described above.

Design Skew

Design skew refers to timing relations that can be determined when the circuit is designed and that do not depend on the particular instance of the design or the particular data values being transmitted. Design skew is given by $$\delta_{R \cdot \Phi \to R \cdot d}^{design},$$

where $$\delta_{R \cdot \Phi \to R \cdot d}^{design} = \delta_{\Phi \to T \cdot \Phi}^{design} + \delta_{T \cdot \Phi \to T \cdot q}^{design} + \delta_{T \cdot q \to R \cdot d}^{design} - \delta_{\Phi \to R \cdot \Phi}^{design}$$

Consider a design with the delay parameters from Table 1 and a 3.0 ns clock period. With these values for the timing parameters, each data value is guaranteed to arrive at the receiver's input, R. d, at least $$\delta_{R \cdot \Phi \to R \cdot d}^{design} \geq \min(\delta_{\Phi \to T \cdot \Phi}) + \min(\delta_{T \cdot \Phi \to T \cdot q}) +$$
$$\min(\delta_{T \cdot q \to R \cdot d}) - \max(\delta_{\Phi \to R \cdot \Phi}) =$$

-continued
$$\left(\delta_{\Phi \to T \cdot \Phi}^{design} + \min(\delta_{\Phi \to T \cdot \Phi}^{static}) + \min(\delta_{\Phi \to T \cdot \Phi}^{dynamic})\right) + \left(\delta_{T \cdot \Phi \to T \cdot q}^{design} + \min(\delta_{T \cdot \Phi \to T \cdot q}^{static}) + \min(\delta_{T \cdot \Phi \to T \cdot q}^{dynamic})\right) + \left(\delta_{T \cdot q \to R \cdot d}^{design} + \min(\delta_{T \cdot q \to R \cdot d}^{static}) + \min(\delta_{T \cdot q \to R \cdot d}^{dynamic})\right) - \left(\delta_{\Phi \to R \cdot \Phi}^{design} + \min(\delta_{\Phi \to R \cdot \Phi}^{static}) + \min(\delta_{\Phi \to R \cdot \Phi}^{dynamic})\right) == 0.8 \ ns$$

time units after the clock event arrives at R.Φ. A similar calculation yields:

$$\delta_{R \cdot \Phi \to R \cdot d}^{design} \leq 2.6 \ ns$$

Thus, data value from the previous clock event is guaranteed to arrive at R. d at least 0.4 ns before the current clock event and remain stable until at least 0.8 ns after the current clock event. This data can be reliably acquired by a latch with a set-up time less than 0.4 ns and a hold time less than 0.8 ns. This is an example of a traditional, synchronous interface.

The design skew of the example above is $$\delta_{R \cdot \Phi \to R \cdot d}^{design} = 1.7 \ ns.$$

This skew gives the nominal time separation between clock events and the changing of data at the input of the receiver. This nominal separation can be used to determine a phase during each clock period when the receiver can reliably sample the data from the transmitter. In general, if the clock period is large compared to the uncertainty in wiring and circuit delay, then synchronous communication can be used directly.

Static Skew

Although it may not be possible to determine tight bounds for delay at design time, it may be the case that the delays for a particular instance of the circuit do not change much as the circuit operates. The portion of the skew that is fixed for any particular instance is the static skew. Static skew is given by $$\delta_{R \cdot \Phi \to R \cdot d}^{static},$$

where $$\delta_{R \cdot \Phi \to R \cdot d}^{static} = \delta_{\Phi \to T \cdot \Phi}^{static} + \delta_{T \cdot \Phi \to T \cdot q}^{static} + \delta_{T \cdot q \to R \cdot d}^{static} - \delta_{\Phi \to R \cdot \Phi}^{static}$$

Consider a design with the delay parameters from Table 1 and a 2 ns clock period. With this clock period, data from the previous clock event is not guaranteed to arrive until 0.6 ns after the current clock event. However, this data is only guaranteed to be stable until 0.8 ns after the current clock event. It may not be practical to build a latch that can operate reliably with only 0.2 ns available for both set-up and hold.

For any particular instance of this design, a much larger set-up and hold window can be guaranteed. For example, if an instance has $$\delta_{R.\Phi \rightarrow R.d}^{static} = 0.3 \text{ ns},$$

then $\delta_{R.\Phi \rightarrow R.d} \in [1.6 \text{ ns}, 2.4 \text{ ns}]$. For this instance, data from the previous clock event is not guaranteed to arrive until 0.4 ns after the current clock event. However, this data is guaranteed to remain stable until at least 1.6 ns after the current clock period. Thus, if the receiver's latch is triggered 1 ns after the receiver's clock event, the latch will be guaranteed 0.6 ns of set-up time and 0.6 ns of hold time. For other instances, some other clock phase can be used to reliably acquire the data; for any value of the static skew, there is a 1.2 ns window where the data from the transmitter is stable.

Dynamic Skew

The timing properties of the circuit may vary while the circuit is operating. This variation can arise for a variety of reasons, including fluctuations in temperature or power supply voltage, or delays that are dependent on data values. We refer to this variation as "dynamic skew." Dynamic skew is given by $$\delta_{R.\Phi \rightarrow R.d}^{dynamic}$$

where $$\delta_{R.\Phi \rightarrow R.d}^{dynamic} = \delta_{\Phi \rightarrow T.\Phi}^{dynamic} + \delta_{T.\Phi \rightarrow T.q}^{dynamic} + \delta_{T.q \rightarrow R.d}^{dynamic} - \delta_{\Phi \rightarrow R.\Phi}^{dynamic}$$

If the range of $$\delta_{R.\Phi \rightarrow R.d}^{dynamic}$$

is large, then the interface must be able to adapt to variations in the relative timing of the clock and data signals during operation.

In the remainder of this document, the term "skew" refers to uncertainties in the time delays, i.e., static and dynamic skew. In particular, "design skew" does not introduce any uncertainty and can be readily handled using standard design techniques. We have mentioned "design skew," because it has appeared in the engineering literature as "skew" with solutions that involve two- or multi-phase clocks. We have described it here to make it clear that it is not a serious problem in state-of-the-art design and that it is not the topic of the current invention.

This disclosure presents a system that addresses the problems of skew in a synchronous system. In particular, self-timed networks can be used to provide robust communication between synchronous clients operating at the same frequency but with uncertainties in the delays for transmitting clock and data signals.

Both static and dynamic skew can be tolerated. The design of self-timed networks is not novel. However, the application of networks more general than a simple FIFO for the transmission of data between synchronous clients is novel. An important part of this invention is the derivation of conditions that are sufficient to guarantee correct operation of the self-timed network in this context.

Self-Timed Network

One embodiment of the present invention allows a self-timed network to serve two purposes. First, the network can provide data routing or computation. For example, the network can operate as a switch fabric connecting synchronous clients. Second, the network adaptively compensates for skew. By combining the data routing and skew absorption functions, these networks can offer lower latency than existing solutions.

A self-timed network can solve the skew problem for communicating synchronous clients. In self-timed design, communication is controlled by handshake signals: when a module is ready to receive data, it asserts a "request" event; when a module has provided data in response to a request, it asserts an "acknowledge" event. In the current invention, a synchronous client that sends data into the self-timed network transmits one datum and asserts one acknowledgement each clock period. Likewise, a synchronous receiver accepts one datum and asserts one request each clock period.

The synchronous transmitters do not wait for request signals from the self-timed network, nor do the synchronous receivers wait for acknowledgements. Instead, timing bounds are established for the operation of the self-timed network that ensure that the self-timed network completes each transaction with each synchronous client fast enough to ensure that data is reliably transferred and that the handshake protocols are properly observed.

Figure 2:
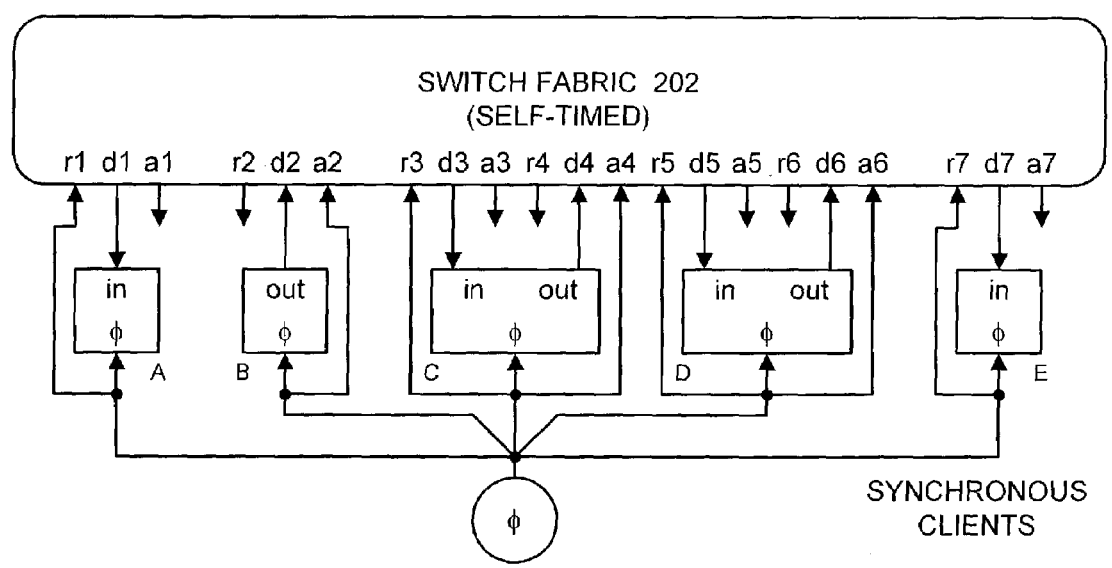
FIG. 2 illustrates a many-to-many source-synchronous communication system that uses a self-timed communication network in accordance with an embodiment of the present invention.

FIG. 2 shows a "multi-port STARI network." The design is a generalization of STARI, "Self-Timed At Receiver's Input," presented in "Using Synchronized Transitions for Simulation and Timing Verification," by Mark. R. Greenstreet, Proceedings of the 1992 Workshop on Designing Correct Circuits, pp. 215–236, January 1992, Lyngby, Denmark, Elsevier. This conference paper proposes networks with a single sender and a single receiver.

In the design illustrated in FIG. 2, the global clock, $\Phi$ is distributed to each of the synchronous clients: A, B, C, D, and E. During each period of the global clock, each receiver (A, C, D, and E) requests one datum from the network by asserting an event on its request (i.e., $r_i$ signal), and once per clock cycle, the receiver samples the value at its input, in. The acknowledgement signal from the self-timed network, $a_i$ is ignored. Thus, it must be shown that data always arrives from the network in the proper set-up and hold window for the receiver. For simplicity, we assume that the receiver samples the value of the signal in at the same time as it makes its next request on the signal $r_i$. This yields the first condition for correct operation.

Condition 1—Before receiver i asserts its k-th request on $r_i$ the self-timed network must have asserted k-1 acknowledgements on $a_i$.

Note that before the network asserts its k-th acknowledgement on $a_i$, the receiver must have asserted k requests on $r_i$. Likewise, during each period of the global clock, each sender (B, C, and D in FIG. 2) delivers a datum to the network along with asserting an acknowledge event on signal $a_j$, and the request from the self-timed network, $r_j$ is ignored. Thus, it must be shown that the network has already accepted the previous datum when the current datum and acknowledgment arrive from the receiver. This yields the second condition for correct operation.

Condition 2—Before sender j asserts its k-th acknowledgement on $a_j$, the self-timed network must have asserted k requests on $r_j$.

Note that before the network asserts its k-th request on $r_j$, the sender must have asserted k-1 acknowledgements on $a_j$.

Conditions 1 and 2 taken together mean that the interaction between the self-timed network and the synchronous clients follows a request-acknowledge self-timed protocol. However, the synchronous clients do not test the handshake signals from the self-timed network. Instead, the correctness of the synchronous clients is guaranteed by bounds on the clock period, the skews, and the delays within the network.

Self-Timed Networks

Some of the self-timed networks considered in this disclosure can be modeled by live, safe, marked graphs. Let $G=(V, E)$ be a directed graph where $V=\{v_1, v_2, \ldots, v_n\}$ are the vertices, and $E \subseteq V \times V$ are the edges. An edge can be either "marked" or "empty." The initial marking is given by $M_0 \subseteq E$. When all of the edges incoming to a vertex are marked, the markers can be removed from these edges, and markers are placed on each of the outgoing edges from the vertex. This is called a "firing" of the vertex. The graph is live if from any reachable marking, all vertices will eventually fire, and if any vertex that remains enabled to fire will eventually fire (this follows from our assumption that every C-element has bounded delays). The graph is safe if whenever a vertex is enabled to fire, all edges outgoing from the vertex are empty.

Figure 3:
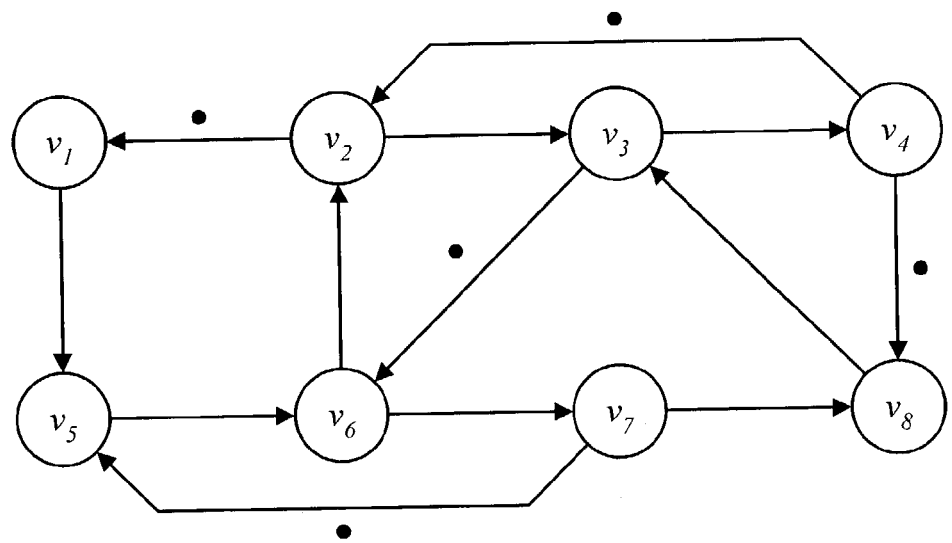
FIG. 3 illustrates a marked graph for a self-timed network in accordance with an embodiment of the present invention.

For example, FIG. 3 shows a marked graph for a simple self-timed network. Initially, only vertex v1 is enabled to fire. Firing v1 removes the marker from the edge from v2 to v1 and places a markers on the edge from v1 to v5, which enables vertex v5 to fire. After vertex v5 fires, v6 is enabled to fire, and after vertex v6 fires, vertices v2 and v7 are enabled to fire.

The marked graph in FIG. 3 is safe and live. Safety can be seen by noting that firing a vertex preserves the number of markers in any cycle of edges, and noting that every edge is in a cycle with exactly one marker. Thus, no edge can become double marked.

Liveness can be seen by noting that from the initial state the nodes can be fired in the order: $v_1, v_5, v_6, v_2, v_7, v_8, v_3$, and $v_4$. This returns the graph to its initial marking. Repeating this sequence produces an infinite execution. Because the network is choice-free (i.e. when one node fires it cannot disable other nodes from firing) and safe, all vertices will eventually fire from any reachable marking.

For this discussion, a marker on an edge can correspond to the level of a signal, a pulse, or a value in a particular subset of a self-timed code. In particular, our analysis applies to bundled data, dual-rail, and other self-timed signaling conventions.

Figure 4:
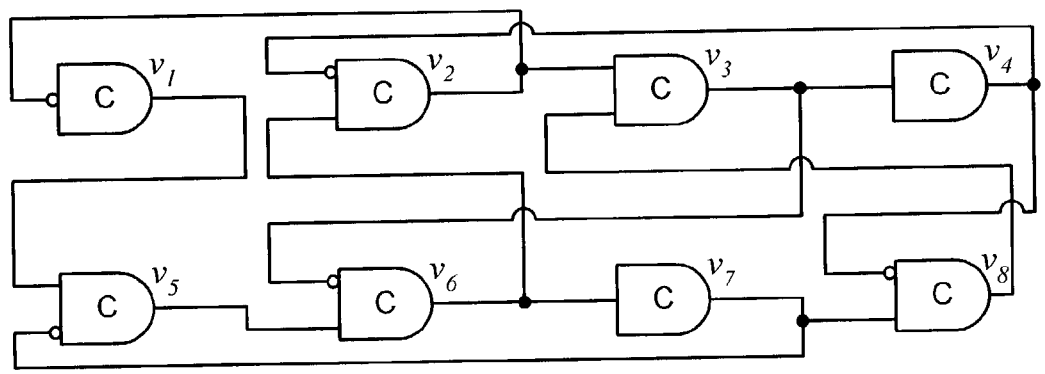
FIG. 4 illustrates an implementation of the network illustrated in FIG. 3 in accordance with an embodiment of the present invention.

One implementation of a live, safe, marked graph is a network of Muller C-elements. Each vertex corresponds to a C-element with one input for each edge incoming to the vertex. Each edge corresponds to a connection from the output of one C-element to an input of another C-element. An edge is marked if the value of the corresponding signal is the one required to excite the next transition of the C-element to which this signal is an input. When the reset signal is asserted, all C-element outputs are set to the logical low value. If an edge is marked in the initial marking, the corresponding C-element input is inverted. Such an implementation of a live, safe, marked graph is a delay-insensitive circuit. FIG. 4 shows this style of implementation for the marked graph from FIG. 3; to reduce clutter, we did not draw a reset signal in this figure.

Timing

Note that the model we use to illustrate this invention was chosen for simplicity, and is not meant to restrict the set of timing models that can be used with the present invention. To show that a self-timed network can be used with synchronous clients, bounds on the relative times of operations in the network must be established. We illustrate our approach with a simple timing model that associates a time with each vertex and delay bounds with each edge. In particular, $\tau(v)$ denotes the last firing time of vertex v. For each edge, $u \rightarrow v$, $\delta(u, v)$ denotes the minimum delay associated with this input to v, and $\delta_{max}(u, v)$ denotes the maximum delay. In particular, if all incoming edges to vertex v are marked, v will fire no sooner than $$\max_{u|u \rightarrow v} \tau(u) + \delta_{min}(u, v)$$

and no later than $$\max_{u|u \rightarrow v} \tau(u) + \delta_{min}(u, v)$$

The extension of our method to other timing models is straightforward. Every live, safe, self-timed network has a natural period. For simplicity, consider the case where edge delays are precise: $\forall u, v | u \rightarrow v. \delta_{min}(u, v) = \delta_{max}(u, v)$. The natural period of the network is given by:

$$P_0(G) = \max_{c \in cycles(G)} \frac{\sum_{(u \rightarrow v) \in c} \delta_{max}(u, v)}{\sum_{(u \rightarrow v) \in c} \chi((u \rightarrow v) \in M_0)}$$

where G is the marked graph representation of the network, $M_0$ is the initial marking of G, and $\chi((u \rightarrow v) \in M_0)$ has a value of 1 if $(u \rightarrow v)$ is initially marked and 0 otherwise. The natural period can be computed efficiently using well-known techniques.

For example, consider the network corresponding to the marked graph from FIG. 3. Assume that a delay of 2 time units is associated with every edge entering a single input C-element, and that a delay of 3 time units is associated with every edge entering a two input C-element. This network has a natural period of eleven time units which corresponds to the cycle $v_1 \rightarrow v_5 \rightarrow v_6 \rightarrow v_7$, or to the cycle $v_6 \rightarrow v_7 \rightarrow v_8 \rightarrow v_3$.

If edges have differing upper and lower delay bounds, then the equation above can be used to bound the long-term, time average of the time between consecutive firings for each vertex. For a particular vertex and a particular pair of consecutive firings, the interval may be either shorter or longer than this period.

Polyphase Clock Buffers

A polyphase clock buffer is a self-timed network where one of the C-elements has an input connected to an externally generated clock signal. (See U.S. Pat. No. 6,304,125, entitled "Method for Generating and Distribution of Polyphase Clock Signals," by inventor Ivan E. Sutherland.) If the period of the clock signal is greater than the natural period of the self-timed network, then the clock event will be the last arrival at its C-element each cycle, and the network will operate at the same period as the clock. If we assume that edge delays are precise, then each element will have its own phase offset from the clock and will fire once for each clock event with that offset. If edges have differing upper and lower delay bounds, then each element will still fire exactly once for each clock event, but the phase offsets will not necessarily be fixed.

As an example, FIG. 5 shows the marked graph for a polyphase clock buffer adapted from the self-timed network from FIGS. 3 and 4. As was discussed above, we assume that one input C-elements have a delay of 2 time units and that two input C-elements have a delay of three time units. Thus, this network has a natural period of twelve time units determined by the cycle $v_1 \to v_2 \to v_4 \to v_5 v_7 \to v_8$ and by the cycle $v_1 \to v_5 \to v_6 \to v_2$ (note that the delay for the edge from $v_2$ to $v_1$ is now three time units). Assume that the clock has a period of fifteen time units. Then, this network will operate as a polyphase clock buffer with a period of fifteen time units. The "actual" column of Table 2 shows the offsets from the time of a clock event to the time of each vertex firing. Note that vertices $v_3$ and $v_4$ respond more than one clock period after the triggering clock event arrives at $v_1$. This shows an advantage of the self-timed design technique: the self-timed network can reliably propagate clock events even when the total propagation delay is greater than a clock period.

TABLE 2

| vertex | actual | deadline |
|---|---|---|
| $v_1$ | 3 | 15 |
| $v_2$ | 12 | 28 |
| $v_3$ | 17 | 37 |
| $v_4$ | 19 | 40 |
| $v_5$ | 6 | 22 |
| $v_6$ | 9 | 25 |
| $v_7$ | 11 | 32 |
| $v_8$ | 14 | 34 |

Because the natural period of the network is less than the clock period, there is some slack in the schedule. This slack allows the network to be modified and still preserve safe operation. For example, an input could be added to a vertex other than $v_1$, with this input connected to a delayed version of the clock generator; as long as this does not delay the firing of the vertex by too much, the network will continue to operate without timing hazards. The "deadline" column gives the time before which the corresponding vertex must fire to ensure that the network remains safe.

The deadlines given by Table 2 are much greater than the "actual" times. When operated as a polyphase clock buffer, vertex $v_2$ marks the edge to vertex $v_1$, before the next clock event is received. This is because the natural period of the self-timed network is less than the clock period. Thus, $v_1$ fires shortly after it receives a clock event. However, safe operation only requires that $v_1$ consume the current clock event before the next one arrives. Thus, $v_1$ can fire almost a full clock period after receiving a clock event. If a vertex firing is delayed beyond this deadline, then the clock may place a token on the input of node $v_1$ before the previous token is consumed; this corresponds to a timing failure.

Multi-Port STARI Networks

Figure 6:
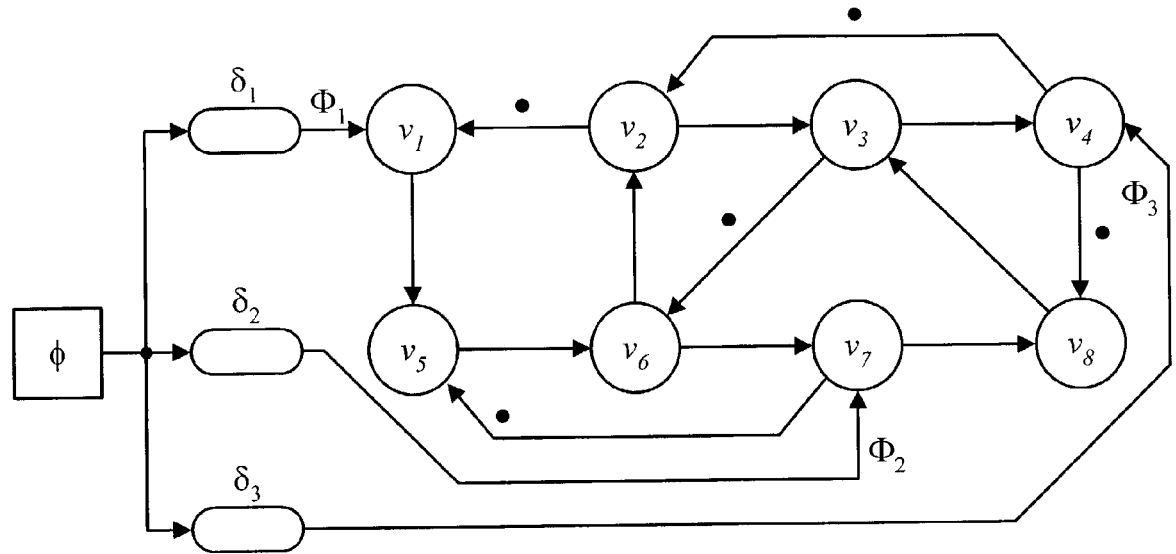
FIG. 6 illustrates a marked graph for a multi-port STARI network in accordance with an embodiment of the present invention.

FIG. 6 shows the marked graph from FIGS. 3 and 5 modified so that several vertices receive inputs derived from the clock generator. With each clock event, each clock input places a marker on its edge. A timing error occurs if and only if a marker is placed on an edge before the previous marker is removed.

The model shown in FIG. 6 is an abstraction of the networks depicted in figure FIG. 2. Unlike the network shown in FIG. 2, this model does not distinguish between synchronous clients that send data into the network and clients that receive data from the network. This is deliberate. The focus of this invention is on building self-timed networks that handshake correctly, even when a number of nodes in the network receive request or acknowledgement inputs from synchronous clients. Once the handshaking is guaranteed to operate correctly, ensuring correct data transfer is relatively straightforward. There are many particular ways of implementing the data transfer including the use of completion-detecting codes, bundled data and control, and skew tolerant codes, as just a few examples. Likewise, handshakes can be two-phase, four-phase, level-based, pulse-based, etc.

The embodiment of the present invention illustrated in FIG. 2 does not depend on the particular techniques used for implementing data transfers or handshakes. Thus, we try to avoid referring to specific handshaking protocols or particular synchronous latch designs. To give the reader an idea of how data transfer could be done, we describe a possible implementation in a following portion of this disclosure.

We require that every vertex has least one unmarked, incoming edge in the initial marking. This means that after initialization, all nodes are stable until one or more events are received from the synchronous clients. This requirement seems natural; so, we will not propose alternatives.

If appropriate bounds are satisfied for the relative timing of events from the various synchronous clients, then the multi-port STARI network will operate without errors. This allows the synchronous clients to communicate reliably even in the presence of large skews.

Flow Control

In self-timed design, handshakes between modules serve two purposes. First, handshakes are used to ensure that the timing conditions of the two modules are satisfied; this mechanism allows each stage to establish the maximum rate at which it can operate reliably. For example, in a self-timed pipeline, handshakes ensure that the pipeline operates no faster than the rate at which the slowest stage can process data. Second, handshakes are used for flow control: many self-timed modules present interfaces that resemble FIFOs; flow control is used to ensure that these FIFOs neither overflow nor underflow.

Unlike traditional, self-timed designs, the designs presented here do not use handshakes to establish the rate at which operations can be performed by the synchronous clients in the network. In the designs considered in this disclosure, the global clock signal determines the rate at which clients operate. Every node of the self-timed network performs one operation for each event from the global clock. Correct operation requires that the network be capable of sustaining operations at this rate.

Figure 7:
FIG. 7 illustrates a simple data routing switch in accordance with an embodiment of the present invention.

As an example, FIG. 7 shows a simple data routing switch with two inputs, I and J and two outputs X and Y: in each cycle of operation, the switch module receives a value from each input and sends a value to each output. Each value is composed of a data field, a destination field ("dst" in FIG. 7) that specifies where the value should be sent, and a "full" bit ("f" in FIG. 7) that can be cleared to indicate that this value can be ignored by the switch. If I is to be routed to X and J is to be routed to Y, no contention occurs. On the other hand, if both are to be routed to X, then the switch may route one of the inputs (e.g. I) to X and store the value from J in an internal buffer. Thus, if the switch module has several values to output to X, it outputs one each cycle and holds the others in an internal buffer. Likewise, if on some cycle the switch module has no values to output to X, it asserts a "nothing-to-send" tag on the X output. Of course, the switch's buffer can only have limited capacity. If this capacity is approached, then the switch may send an "I'm full" message back to the modules generating the I and J inputs. This directs those modules to send "nothing-to-send" tokens until the switch indicates that it is again able to receive.

Figure 8:
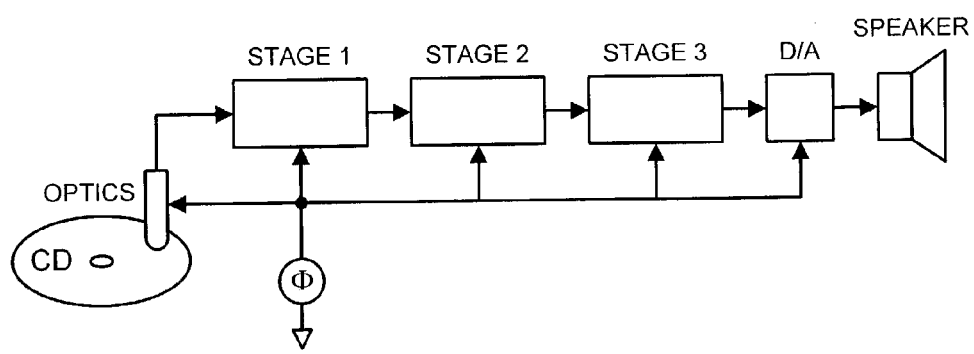
FIG. 8 illustrates an example of a CD player in accordance with an embodiment of the present invention.

Alternatively, some designs may not require flow-control. For example, FIG. 8 shows the block diagram of a highly simplified CD player. The digitally encoded signal is read from the CD by the optics module. This signal is processed by a three stage pipeline (e.g. an interpolating filter for over-sampling). The output of this filter is the input to a D/A converter, whose output drives a loud speaker. The optics module generates one sample for each period of the global clock, $\Phi$. Each pipeline stage inputs one sample per period of the clock and outputs one sample for each period of the clock. Each stage performs a fixed computation on each sample, and the stages are designed so that each stage's computation fits exactly in one clock cycle. The D/A converter receives one sample for each period of the global clock and outputs a voltage corresponding to this digital value. Because each stage of the pipeline processes exactly one sample per clock cycle, no flow control is needed. This is why FIG. 2 shows the possibility of clients such as the optics module that send data into the network but do not receive data from the network (i.e. client B in FIG. 2) and clients such as the D/A converter that only receive data from the network but do not send data (i.e. clients A and E in FIG. 2).

Other designs may use other conventions. However, an important consideration is that flow-control is encoded in data values. Flow control is not implemented with handshakes. Every client performs one handshake on each of its interfaces for each event from the global clock.

Data Transfers

As explained earlier, the present invention not depend on the particular techniques used for implementing data transfers or handshakes. To aid the reader's intuition, this section describes one possible implementation that uses four-phase handshaking in the self-timed network and positive-edge-triggered latches in the synchronous clients.

A four-phase handshake interface includes three signals: a request, an acknowledge, and data to be transferred. The request signal is controlled by the receiver of data and the acknowledge and data signals are controlled by the sender. Initially, the request and acknowledge signals are both low. When the receiver is ready to accept a new data value and the acknowledge signal is low, the receiver raises the request signal. In response, the sender outputs a data value to the data wire(s) and then raises the acknowledge signal. After the acknowledge signal is high, the receiver may lower the request signal. After the request signal is low, the sender may lower the acknowledge signal; this returns the interface to its initial state. For the current discussion, we assume that the sender only changes its data output after receiving a request (i.e. the data output remains valid after the acknowledge signal is lowered).

A positive-edge-triggered D-latch has a data input, D, a clock input, $\Phi$ and a data output Q. When the clock makes a low-to-high transition, the value present at the D input is copied to the Q output. To ensure that the value of D is unambiguous, there are set-up and hold requirements that are specified by the real numbers $t_{set-up}$ and $t_{hold}$, respectively. For proper operation, the D input must remain unchanged throughout a well-defined value in an interval that starts $t_{set-up}$ time units before the rising edge of the clock and ends $t_{hold}$ time units after the rising edge of the clock.

Figure 9:
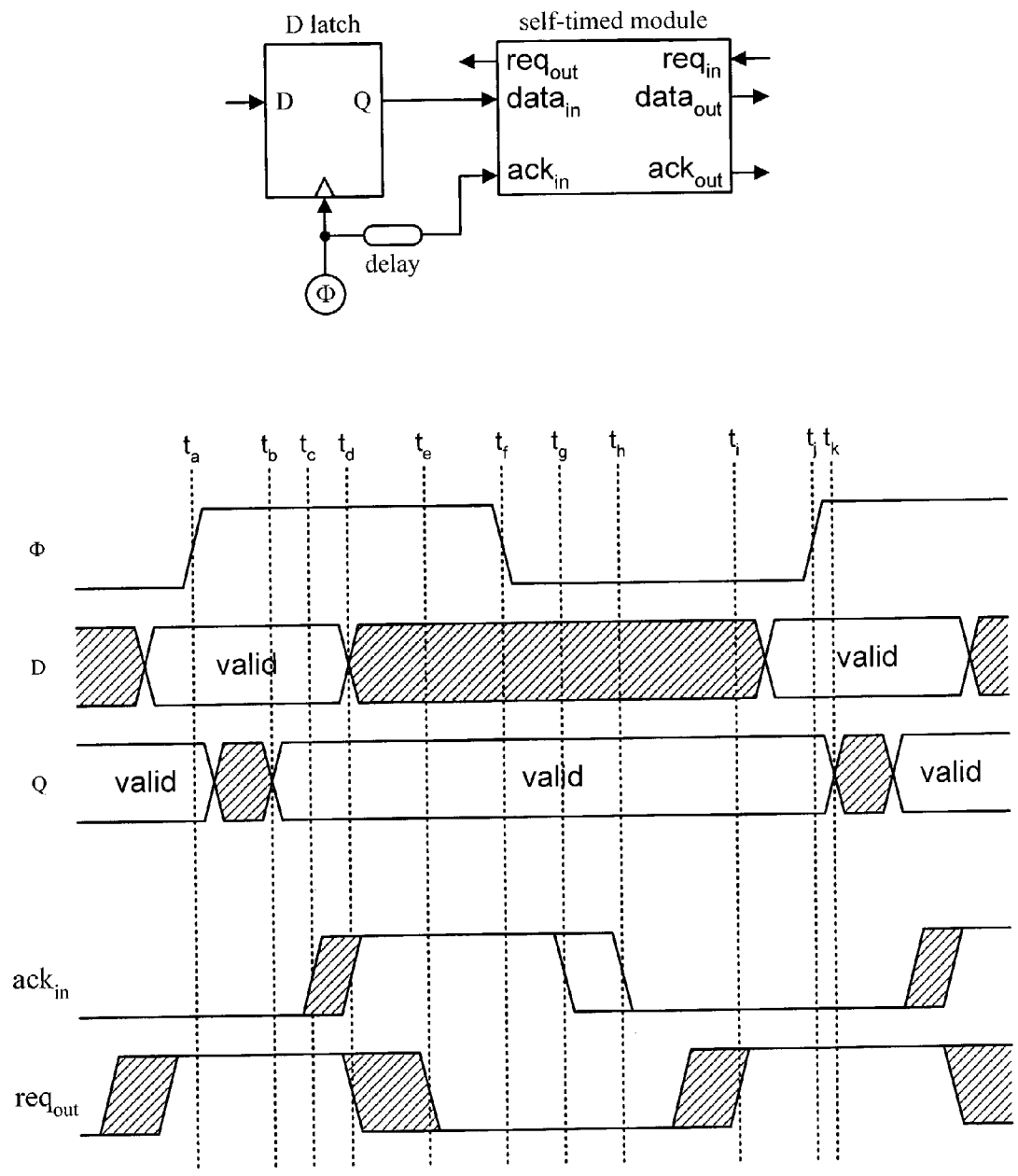
FIG. 9 illustrates the process of transferring data from a synchronous latch to the self-timed network in accordance with an embodiment of the present invention.

FIG. 9 shows how data can be transferred to the self-timed network from a synchronous client. The Q output of the D-latch changes on the rising edge of $\Phi$. Delaying $\Phi$ produces an $ack_{in}$ signal that rises after $data_{in}$ is guaranteed to be valid. In response to $ack_{in}$ rising, the self-timed module will drop $req_{out}$. Conversely, $ack_{in}$ will drop after the falling edge of $\Phi$. Thus, if it can be shown that the self-timed module will always drop $req_{out}$ within half of a clock period, then the self-timed handshaking protocol will be satisfied.

Examining the handshake protocol in greater detail, the ordering of events must satisfy the following properties:

1. The rising edge of $req_{out}$ must precede changing of the data. In FIG. 9, this means that $t_i < t_k$. Note that $t_i = t_f + (t_h - t_f) + (t_i - t_h)$, where $t_h - t_f$ is the maximum delay of the delay line and $t_i - t_h$ is the maximum delay from a falling acknowledgement to the next rising request. Similarly, $t_k = t_f + (t_j - t_f) + (t_k - t_j)$ where $t_j - t_f$ is the minimum half-period of the clock and $t_k - t_j$ is the minimum clock to Q propagation delay of the D-latch. To satisfy the handshaking protocol, we must show:

$$t_i - t_h \leq (t_j - t_f) + (t_k - t_j) - (t_h - t_f)$$

In English,
 maximum $ack_{in}\downarrow$ to $req_{out}\uparrow$ delay
 $\leq$ minimum clock half-period
 + minimum clock to Q delay
 − maximum delay line delay The quantities on the right side of the inequality are simple properties of the clock generator and the circuit elements. The quantity on the left side of the inequality depends on the operation of the self-timed network.

2. Data must be valid before the rising edge of $ack_{in}$. This is guaranteed if the maximum clock-to-Q propagation delay of the D latch (i.e. $t_b - t_a$) is less than the minimum delay of the delay line (i.e. $t_c - t_a$). This is a simple property of the circuit elements.

3. The falling edge of $req_{out}$ must precede the falling edge of $ack_{in}$. In FIG. 9 this means that $t_e < t_g$. This is ensured if $$t_e - t_d \leq (t_f - t_a) + (t_g - t_f) - (t_d - t_a)$$

In English,
 maximum $ack_{in}\downarrow$ to $req_{out}\uparrow$ delay
 $\leq$ minimum clock half-period
 + minimum clock to $ack_{in}\downarrow$ delay
 − maximum clock to $req_{out}\uparrow$ delay As with the first requirement, the quantities on the right side of the inequality are simple properties of the clock generator and the circuit elements. The quantity on the left side of the inequality depends on the operation of the self-timed network.

In practice, the synchronous client and the self-timed network may be on separate chips or even separate boards and the delays from the synchronous client to the self-timed network may be substantial. Fortunately, delays that are matched for the clock (i.e. $ack_{in}$) and data paths do not affect the operation of the interface as can be derived from equations that appear above.

Figure 10:
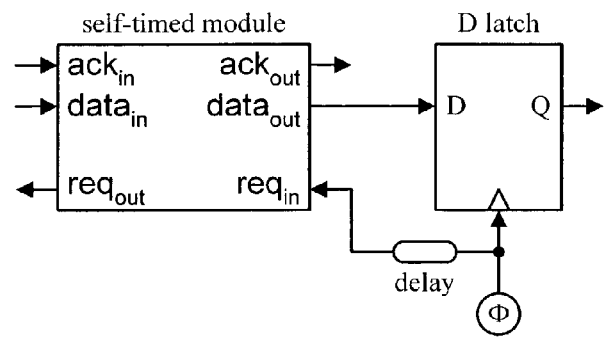
FIG. 10 illustrates the process of transferring data from the self-timed network to a synchronous latch in accordance with an embodiment of the present invention.
Figure 10:
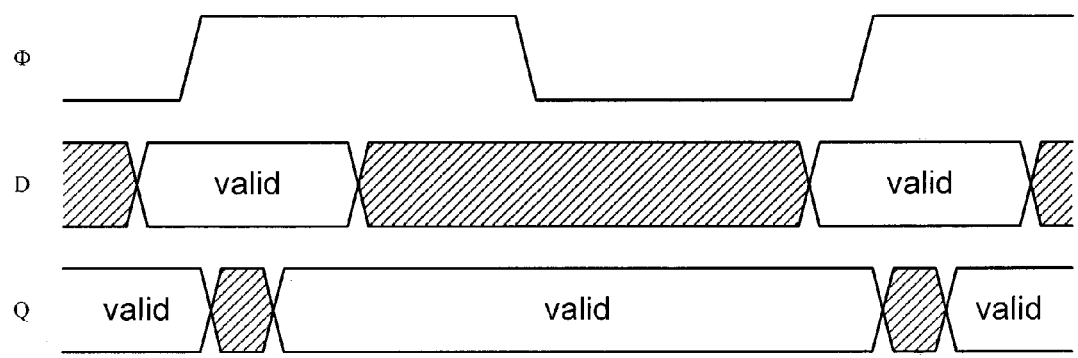
Figure 10:
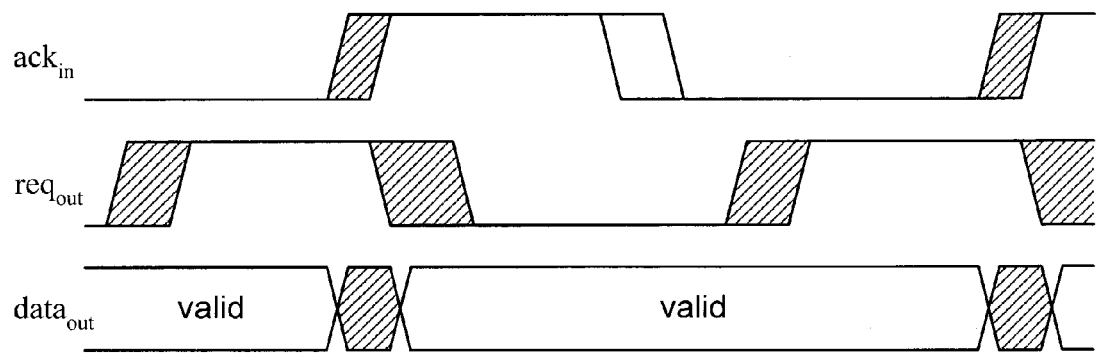

Transferring data from the self-timed network to a synchronous client is similar to the operation in the other direction. FIG. 10 shows how data can be transferred to the self-timed network from a synchronous client. The set-up and hold requirements of the D-latch are indicated by the region around each rising edge of $\Phi$ where D must be "valid" (i.e. unchanging and with a well-defined value). In this implementation, a delayed version of $\Phi$ is sent to the self-timed network as a request. The delay is chosen to be large enough to ensure that the output of the self-timed network does not change until after the hold-time requirement of the D-latch has been satisfied. For correct operation, the $data_{out}$ signal from the self-timed network must settle to a valid value at least $t_{set-up}$ time units before the next rising edge of Φ. This condition can be formulated in a way similar to the requirements stated above for FIG. 9.

Unlike the design from FIG. 9 where delays on the clock and data lines between the synchronous client and the self-timed network were canceling, here they are cumulative. In particular, the time at which the D input of the latch changes relative to the rising edge of Φ depends on the sum on these two delays. In as much as the multi-port STARI network is intended to provide robust operation even when wiring delays are large when compared with the clock period, this timing dependency must be addressed.

Determining Skew Tolerance

We now describe a simple method to compute skew bounds for a network. Consider a self-timed network with ports (senders or receivers) p[1] . . . p[n].

```
for each i in [1...n]      (*each receiver*)
    for each j in [1...n]
        if j = i then
            connect the ack or req for p[i] (whichever is an input to
            the network) to the clock.
        else
            connect p[i] to a self-timed client that generates an ack or
            req (whichever is an input to the network) whenever the
            other is received.
        end (*if j=i*)
    end (*for j*)
    let t[i, 1] denote the time the first event at port p[i], and
    let t[i, k] denote the time the kth event.
    for some integer h, it is the case that
        for all i1,i2 in [1...n]
            t[i1,h]−t[i2,h]=t[i1,h+1]−t[i2,h+1]
    In fact, this holds for all times h or after.
    The value of t[j,h]−t[i,h] gives the maximum amount that
    events at port j can be asserted after events at port i.
end (*for i*)
```

This method generates (n choose 2) constraints. Any skews of the synchronous clients that satisfy these constraints are tolerated by the self-timed network.

Variations

We now describe several possible variations on the invention.

Predictive Phase Adjustments

Multi-port STARI networks can accept data from synchronous clients with a wide variation of skew. It is also necessary to transmit data back to the clients. A simple approach to this is to use a STARI style interface at the input of the client; however, this scheme incurs unnecessary latency. A lower latency approach is to employ a separate output clock for each client. This output clock can be provided by the client, in which case the switch fabric sends the output clock back to the client along with bundled data. The client compares the phase of the clock that it receives from the switch fabric with the desired phase and adjusts the phase of the clock that it sends to the switch fabric accordingly. Alternatively, the switch fabric can generate the output clock from the input clock that it received from the client and a tunable delay line. In this arrangement, the client sends a control signal to advance or retard the phase of the output clock as required. This approach is similar to the use of tunable delay lines to match the clock phase of a processor with its co-processors.

Multi-Rate Networks

In some applications, different clients may operate at different rates, but all of them operate at rational multiples of a common clock. For example, a system could combine interfaces operating at 100 MHz, 400 MHz, and 500 MHz, all derived from a common, 100 MHz clock. This could also be used for networks where the design distinguishes rising and falling edges of the clock signals.

Inexact Frequency Matching

In some applications, a common clock generator may not be used for all clients. However, it may be known that the clock frequencies of the clients are closely matched. In this case, it should be possible to build a network that retains the low-latency advantages of multi-port STARI networks. Synchronizers can be used to determine when a client is getting ahead of its peers in the network. When a one-cycle advance is detected, the client abstains from handshaking for one cycle.

Unlike pipeline synchronization, these synchronizers can be separate from the data path. For example, if a synchronizer has a ten-cycle latency, then its output will describe the status of the network ten cycles ago. However, if the client clock rates are matched to one part in a thousand, this estimate is good to one-percent of a clock cycle. This suggests that multi-port STARI networks can be built to accommodate clients operating at different clock frequencies while providing client-to-client latencies that are less than the synchronization latency.

Note that there has been a fair amount of prior work on designs with nearly matched clocks (sometimes called "plesiochronous"). For example, D. G. Messerschmitt, "Synchronization in Digital System Design," *IEEE Journal on Selected Areas in Communications,* 8(8):11404—1419, October 1990. Also, L. R. Dennison, W. J. Dally and D. Xanthopoulos, "Low-Latency Plesiochronous Data Retiming," *Proceedings of the 16$^{th}$ Anniversary Conference on Advanced Research in VLSI,* pages 304—315, 1995. As with prior source-synchronous designs, these have been based on point-to-point links. The present invention generalizes this to multiport links.

Using STARI Networks for Data Buffering

In the networks described so far, each source-client inserts one data value every clock cycle and each sink-client removes one data value every clock cycle. We have assumed that flow control is embedded into the data values. For example, if a buffer is approaching its capacity, then, a control message can be sent back to the source directing it to suspend data transmission. Such a source will send "null" values until the buffer has partially emptied and sends a "resume data transmission" message.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for providing skew compensation through a self-timed network that supports source-synchronous communication, comprising:

allowing multiple synchronous transmitters to transmit one data element and to assert one acknowledgement on a transmit clock line into the self-timed network during each clock period;

wherein the multiple synchronous transmitters do not wait for requests from the self-timed network before transmitting a subsequent data element; and allowing multiple synchronous receivers to accept one data element from and to assert one request on a receive clock line coupled into the self-timed network during each clock period;

wherein the multiple synchronous receivers do not wait for acknowledgments from the self-timed network before receiving a subsequent data element;

wherein the self-timed network tolerates bounded skew between the multiple synchronous transmitters and multiple synchronous receivers.

2. The method of claim 1, further comprising routing data elements across the self-timed network between the multiple synchronous transmitters and the multiple synchronous receivers.

3. The method of claim 2, wherein the routing of data elements across the self-timed network is regulated using Muller C-elements.

4. The method of claim 2, wherein routing the data elements across the self-timed network involves using a two-dimensional mesh to route the data elements.

5. The method of claim 2, wherein routing the data elements across the self-timed network involves using intermediate routing nodes that generate a response before a subsequent input arrives, whereby data elements in-flight across the self-timed network do not stack up at the intermediate routing nodes.

6. The method of claim 1, further comprising queuing data between the self-timed network and the multiple synchronous receivers using first-in-first-out (FIFO) buffers.

7. The method of claim 1, wherein the multiple synchronous transmitters and the multiple synchronous receivers do not have exactly matching frequencies.

8. The method of claim 1, wherein the multiple synchronous transmitters and the multiple synchronous receivers operate at multiples of a common clock frequency.

9. An apparatus that provides skew compensation during source-synchronous communication, comprising:
a self-timed network;
multiple synchronous transmitters coupled to the self-timed network;
wherein during each clock period, each of the multiple synchronous transmitters is configured to transmit one data element and to assert one acknowledgement on a transmit clock line into the self-timed network;
wherein the multiple synchronous transmitters do not wait for requests from the self-timed network before transmitting a subsequent data element; and
multiple synchronous receivers coupled to the self-timed network;
wherein during each clock period, each of the multiple synchronous receivers is configured to accept one data element from and to assert one request on a receive clock line into the self-timed network;
wherein the multiple synchronous receivers do not wait for acknowledgments from the self-timed network before receiving a subsequent data element;
wherein the self-timed network tolerates bounded skew between the multiple synchronous transmitters and multiple synchronous receivers.

10. The apparatus of claim 9, wherein the self-timed network is configured to route data elements across the self-timed network between the multiple synchronous transmitters and the multiple synchronous receivers.

11. The apparatus of claim 10, wherein the routing of data elements across the self-timed network is regulated using Muller C-elements.

12. The apparatus of claim 9, wherein the self-timed network is configured as a two-dimensional mesh.

13. The apparatus of claim 10, wherein the self-timed network is comprised of intermediate routing nodes that are configured to generate a response before a subsequent input arrives, whereby data elements in-flight across the self-timed network do not stack up at the intermediate routing nodes.

14. The apparatus of claim 9, further comprising multiple first-in-first-out (FIFO) buffers coupled between the self-timed network and the multiple synchronous receivers for queuing data in transit between the self-timed network and the multiple synchronous receivers.

15. The apparatus of claim 9, wherein the multiple synchronous transmitters and the multiple synchronous receivers do not have exactly matching frequencies.

16. The apparatus of claim 9, wherein the multiple synchronous transmitters and the multiple synchronous receivers operate at multiples of a common clock frequency.

17. A computer system that provides skew compensation during source-synchronous communication between computing nodes, comprising:
multiple computing nodes;
a self-timed network;
multiple synchronous transmitters coupled between the multiple computing nodes and the self-timed network;
wherein during each clock period, each of the multiple synchronous transmitters is configured to transmit one data element and to assert one acknowledgement on a transmit clock line into the self-timed network;
wherein the multiple synchronous transmitters do not wait for requests from the self-timed network before transmitting a subsequent data element; and
multiple synchronous receivers coupled between the multiple computing nodes and the self-timed network;
wherein during each clock period, each of the multiple synchronous receivers is configured to accept one data element from and to assert one request on a receive clock line into the self-timed network;
wherein the multiple synchronous receivers do not wait for acknowledgments from the self-timed network before receiving a subsequent data element;
wherein the self-timed network tolerates bounded skew between the multiple synchronous transmitters and multiple synchronous receivers.

18. The computer system of claim 17, wherein the self-timed network is configured to route data elements across the self-timed network between the multiple synchronous transmitters and the multiple synchronous receivers.

19. The computer system of claim 18, wherein the routing of data elements across the self-timed network is regulated using Muller C-elements.

20. The computer system of claim 17, wherein the self-timed network is configured as a two-dimensional mesh.

21. The computer system of claim 17, wherein the self-timed network is comprised of intermediate routing nodes that are configured to generate a response before a subsequent input arrives, whereby data elements in-flight across the self-timed network do not stack up at the intermediate routing nodes.

22. The computer system of claim 17, further comprising multiple first-in-first-out (FIFO) buffers coupled between the self-timed network and the multiple synchronous receivers for queuing data in transit between the self-timed network and the multiple synchronous receivers.

23. The computer system of claim 17, wherein the multiple synchronous transmitters and the multiple synchronous receivers do not have exactly matching frequencies.

24. The computer system of claim 17, wherein the multiple synchronous transmitters and the multiple synchronous receivers operate at multiples of a common clock frequency.

25. A means for providing skew compensation during source-synchronous communication, comprising:
   a self-timed communication means;
   multiple synchronous transmitting means coupled to the self-timed communication means;
   wherein during each clock period, each of the multiple synchronous transmitting means is configured to transmit one data element and to assert one acknowledgement on a transmit clock line into the self-timed communication means;
   wherein the multiple synchronous transmitting means do not wait for requests from the self-timed network before transmitting a subsequent data element; and
   multiple synchronous receiving means coupled to the self-timed network;
   wherein during each clock period, each of the multiple synchronous receiving means is configured to accept one data element from and to assert one request on a receive clock line into the self-timed communication means;
   wherein the multiple synchronous receiving means do not wait for acknowledgments from the self-timed network before receiving a subsequent data element;
   wherein the self-timed network tolerates bounded skew between the multiple synchronous transmitting means and multiple synchronous receiving means.

* * * * *